(12) United States Patent
Garrity et al.

(10) Patent No.: US 7,746,040 B2
(45) Date of Patent: Jun. 29, 2010

(54) AC TO DC CONVERTER WITH POWER FACTOR CORRECTION

(75) Inventors: Paul Garrity, Rockwall, TX (US); Zaohong Yang, Richardson, TX (US)

(73) Assignee: Flextronics AP, LLC, Broomfield, CO (US)

( * ) Notice: Subject to any disclaimer, the term of this patent is extended or adjusted under 35 U.S.C. 154(b) by 125 days.

(21) Appl. No.: 12/101,353

(22) Filed: Apr. 11, 2008

(65) Prior Publication Data

US 2009/0257256 A1 Oct. 15, 2009

(51) Int. Cl.
*G05F 1/70* (2006.01)
(52) U.S. Cl. ..................................... 323/207
(58) Field of Classification Search ................. 323/207; 363/45, 101
See application file for complete search history.

(56) References Cited

U.S. PATENT DOCUMENTS

| | | | |
|---|---|---|---|
| 5,345,164 A | 9/1994 | Lesea | |
| 5,502,630 A | 3/1996 | Rokhvarg | |
| 5,532,917 A | 7/1996 | Hung | |
| 5,598,326 A | 1/1997 | Liu et al. | |
| 5,608,295 A | 3/1997 | Moisin | |
| 5,617,013 A * | 4/1997 | Cozzi | 323/222 |
| 5,635,825 A | 6/1997 | Lesea | |
| 5,786,990 A | 7/1998 | Marrero | |
| 6,018,472 A | 1/2000 | Vogman | |
| 6,028,776 A | 2/2000 | Ji et al. | |
| 6,249,108 B1 * | 6/2001 | Smedley et al. | 323/207 |
| 6,316,883 B1 | 11/2001 | Cho et al. | |
| 6,744,241 B2 * | 6/2004 | Feldtkeller | 323/207 |
| 6,969,975 B2 * | 11/2005 | Mayer et al. | 323/207 |
| 2005/0017695 A1 * | 1/2005 | Stanley | 323/207 |
| 2005/0104563 A1 * | 5/2005 | Mayer et al. | 323/207 |
| 2007/0262752 A1 * | 11/2007 | Gaikwad et al. | 323/207 |
| 2007/0263417 A1 | 11/2007 | Lin et al. | |

FOREIGN PATENT DOCUMENTS

| | | |
|---|---|---|
| JP | 06-189546 A | 7/1994 |
| JP | 07-143752 A | 6/1995 |
| JP | 11-164555 A | 6/1999 |

OTHER PUBLICATIONS

He et al. Non-Dissipative Dynamic Current-Sharing Snubber for Parallel Connected IGBTs in High Power Boost Converters. 1999 IEEE. Applied Power Electronics Conference and Exposition, vol. 2. pp. 1105-1111. Mar. 1999.

* cited by examiner

*Primary Examiner*—Shawn Riley
(74) *Attorney, Agent, or Firm*—Robert G. Crouch; Robert B. Berube; Marsh Fischmann & Breyfogle LLP

(57) ABSTRACT

An input current shaping AC to DC converter with PFC front end that reduces input current harmonics is provided. In one embodiment, an AC to DC converter connectable with an alternating current source and operable to output a direct current has a PFC front end followed by a DC/DC converter. The PFC front end reduces harmonic components present in an input current waveform received by the PFC front end from the alternating current source and includes current steering circuitry and, optionally, valley filling circuitry. The DC/DC converter is one that presents pure resistive input impedance to the PFC front end. The DC/DC converter outputs the direct current to a load connected thereto.

25 Claims, 10 Drawing Sheets

AC TO DC CONVERTER WITH POWER FACTOR CORRECTION

FIELD OF THE INVENTION

The present invention relates generally to power converters, and more particularly to alternating current (AC) to direct current (DC) converters with power factor corrective (PFC) requirements.

BACKGROUND OF THE INVENTION

AC to DC power converters with PFC capability are desirable in a number of applications including, for example, in laptop and desktop computers. However, conventional AC to DC power converters have high harmonic input currents and their efficiency is not as good as desired for many applications. In this regard, FIG. 1 is a schematic diagram of one prior art AC to DC converter with PFC front end 110. As shown, the PFC front end 110 includes a valley filling circuit 140 (inductor 142, diode 144 and transistor 146) and a current steering network 160 having two capacitors 162, 166 and three diodes 170, 176, 178 arranged in a network with four nodes. FIG. 2 is a plot of a simulated input current waveform 202 for the PFC front end 110 shown in FIG. 1. As shown in the plot of FIG. 2, the input current waveform includes significant harmonics.

SUMMARY OF THE INVENTION

Accordingly, an object of the present invention is providing an AC to DC converter with a PFC front end.

Another object of the present invention is reducing input current harmonics in an AC to DC converter with a PFC front end.

These objects and others are achieved by various aspects of the high efficient input current shaping AC to DC converter with PFC front end of the present invention. According to one aspect, an AC to DC converter connectable with an alternating current source and operable to output a direct current comprises a PFC front end followed by a DC/DC converter. The PFC front end includes current steering circuitry that reduces harmonic components present in an input current waveform received by the PFC front end from the alternating current source. The DC/DC converter comprises one that presents pure resistive input impedance to the PFC front end. The DC/DC converter outputs the direct current to a load. By connecting the objects in the aforementioned ways, the PFC front end does not have a power switch which is operating all the time or even a power switch which is only operating for a short time period around the input current zero crossing. As a consequence, the switching loss is greatly reduced while at the same time keeping a high power factor and low harmonics.

The current steering circuitry may be configured in various manners. In one embodiment, the current steering circuitry comprises three capacitors and six diodes (3C&6D). The three capacitors and six diodes may, for example, be arranged in a network having six nodes. For example, a first capacitor may be connected between a first node and a second node, a second capacitor may be connected between a third and a fourth node, a third capacitor may be connected between a fifth node and a sixth node, a first diode may be connected between the first node and the fifth node, a second diode may be connected between the first node and the third node, a third diode may be connected between the second node and the third node, a fourth diode may be connected between the fourth node and the fifth node, a fifth diode may be connected between the fourth node and the sixth node, and a sixth diode may be connected between the second node and the sixth node. In another embodiment, the current steering circuitry comprises two capacitors and three diodes (2C&3D). The two capacitors and three diodes may, for example, be arranged in a network having four nodes. For example, a first capacitor may be connected between a first node and a second node, a second capacitor may be connected between a third and a fourth node, a first diode may be connected between the first node and the third node, a second diode may be connected between the second node and the third node, and a third diode may be connected between the second node and the fourth node.

In addition to current steering circuitry, the PFC front end of the converter may also include valley filling circuitry that reduces the presence of discontinuities in the input current waveform. In one embodiment, the valley filling circuitry comprises an inductor, a diode, and a switching element. The diode, inductor, and switching element may, for example, be arranged in a network having four nodes. For example, the inductor may be connected between a first node and a second node, the diode may be connected between the second node and a third node, and the switching element may be connected between the second node and a fourth node.

The PFC front end may include other components in addition to the aforementioned current steering circuitry and valley filling circuitry. Further, the PFC front end may be implemented with different embodiments of the current steering circuitry in combination with valley filling circuitry or without valley filling circuitry. For example, the PFC front end may be configured with a 3C&6D current steering network and valley filling circuitry or with a 3C&6D current steering network but no valley filling circuitry. By way of further example, the PFC front end may be configured with a 2C&3D current steering network and valley filling circuitry or with a 2C&3D current steering network and no valley filling circuitry.

According to another aspect, AC to DC conversion means connectable with an alternating current source and operable to output a direct current comprise first stage means for correcting a power factor and second stage means for outputting the direct current to a load connected to the second stage means. The first stage means include current steering means for reducing harmonic components present in an input current waveform received by the first stage means from the alternating current source. The second stage means present pure resistive input impedance to the first stage means. The current steering means may, for example, be current steering circuitry such as, for example, a 3C&6D current steering circuit or a 2C&3D current steering circuit. The first stage means may optionally include valley filling means for reducing the presence of discontinuities in the input current waveform around the zero crossing such as, for example, a valley filling circuit. The second stage means may, for example, be a constant power DC/DC converter.

According to one more aspect, a current shaping AC to DC converter comprises a valley filling circuit, a current steering circuit connected with the valley filling circuit, and a constant power DC/DC converter connected with the current steering circuit and the valley filling circuit. In one embodiment, the current steering circuit comprises three capacitors and six diodes arranged in a network having six nodes with a first capacitor connected between a first node and a second node, a second capacitor connected between a third and a fourth node, a third capacitor connected between a fifth node and a sixth node, a first diode connected between the first node and the fifth node, a second diode connected between the first node and the third node, a third diode connected between the second node and the third node, a fourth diode connected between the fourth node and the fifth node, a fifth diode connected between the fourth node and the sixth node, and a sixth diode connected between the second node and the sixth node. In another embodiment, the current steering circuit comprises two capacitors and three diodes arranged in a network having four nodes with a first capacitor connected between a first node and a second node, a second capacitor connected between a third and a fourth node, a first diode connected between the first node and the third node, a second diode connected between the second node and the third node, and a third diode connected between the second node and the fourth node. In one embodiment, the valley filling circuit comprises an inductor, a diode, and a switching element arranged in a network having four nodes with the inductor connected between a first node and a second node, the diode connected between the second node and a third node, and the switching element connected between the second node and a fourth node.

Various nodes of the current steering network and the valley filling circuit may coincide thereby connecting the valley filling circuit with the current steering circuit. For example, the first and sixth nodes of the 3C&6D current steering network may coincide with the third and fourth nodes, respectively, of the valley filling circuit. In a further example, the first and fourth nodes of the 2C&3D current steering network may coincide with the third and fourth nodes, respectively, of the valley filling circuit. Additionally, input terminals of the DC/DC converter may be connected to various nodes of the current steering network and valley filling circuit. For example, one input terminal of the DC/DC converter may be connected with the coincident first/third nodes of the 3C&6D current steering network/valley filing circuit and the other input terminal of the DC/DC converter may be connected with the coincident sixth/fourth nodes of the 3C&6D current steering network/valley filling circuit. In a further example, one input terminal of the DC/DC converter may be connected with the coincident first/third nodes of the 2C&3D current steering network/valley filing circuit and the other input terminal of the DC/DC converter may be connected with the coincident fourth/fourth nodes of the 2C&3D current steering network/valley filling circuit.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 3:
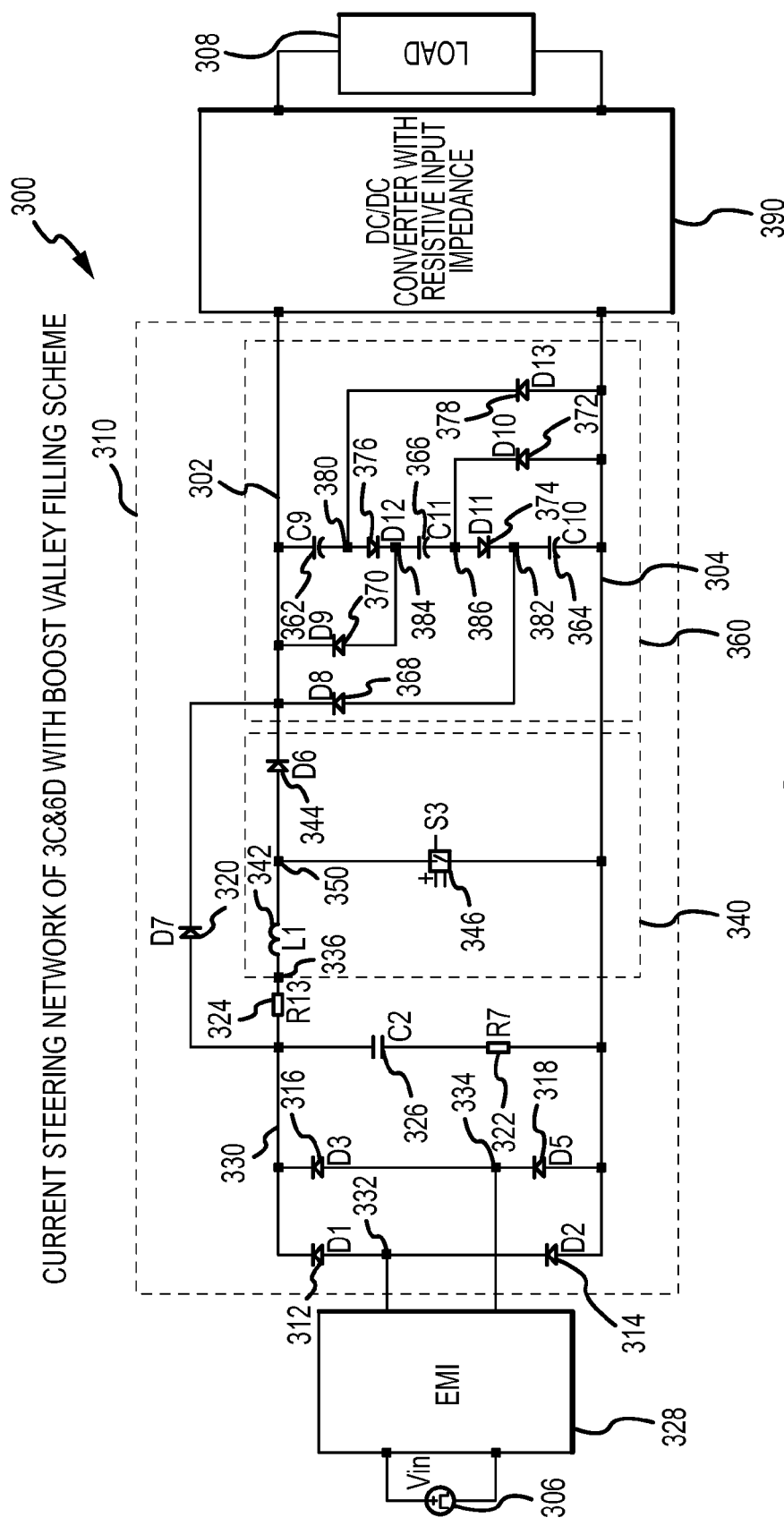
FIG. 3 is a schematic diagram of one embodiment of an AC to DC converter having a PFC front end combining 3C&6D current steering circuitry with valley filling circuitry, followed by a dc/dc converter with pure resistive input impedance.

FIG. 3 shows a schematic diagram of one embodiment of a power converter 300. The power converter 300 includes a valley fill circuit 340, a current steering network 360, and a DC/DC converter 390. The valley fill circuit 340, the current steering network 360, and the DC/DC converter 390 are connected to one another at node 302. The valley fill circuit 340, the current steering network 360 and the DC/DC converter 390 are also connected to common node 304. Common node 304 may be referred to herein as the ground reference or simply ground. The power converter 300 is connectable to an alternating current source 306 (e.g., an electrical outlet) and operates to convert an input alternating current to direct current that may be supplied to a load 308. Together, the valley filling circuit 340 and the current steering circuit 360 comprise a PFC front end 310. In other embodiments, such as described herein in connection with FIGS. 5 and 9, valley filling circuitry is not included in the PFC front end 310.

In addition to the valley fill circuit 340 and the current steering network 360, the PFC front end 310 of power converter 300 may also include various additional components such as diodes (D1, D2, D3, D5, D7) 312-320, resistors (R7, R13) 322, 324, and capacitor (C2) 326. Diode (D1) 312 is connected to diode (D3) 316, diode (D7) 320, resistor (R13) 324 and capacitor (C2) 326 at node 330 and to source 306 through EMI 328 and diode (D2) 314 at node 332. Diode (D2) 314 is connected to diode (D1) 312 and source 306 through EMI 328 at node 332 and to common node 304. Diode (D3) 316 is connected to diode (D1) 312, diode (D7) 320, resistor (R13) 324 and capacitor (C2) 326 at node 330 and to diode (D5) 318 and source 306 through EMI 328 at node 334. Diode (D5) 318 is connected to diode (D3) 316 and source 306 through EMI 328 at node 334 and to common node 304. Diode (D7) 320 is connected to diode (D1) 312, diode (D3) 316, resistor (R13) 324 and capacitor (C2) 326 at node 330 and to valley fill circuit 340, current steering network 360 and DC/DC converter 390 at node 302. Resistor (R7) 322 is connected between capacitor (C2) 326 and common node 304. Resistor (R13) 324 is connected between node 330 and valley fill circuit 340. Capacitor (C2) 326 is connected between node 330 and resistor (R7) 322. The various components included in the power converter 300 in addition to the valley fill circuit 340, current steering network 360 and DC/DC converter 390 and the arrangement thereof are exemplary, and in other embodiments, it may be possible to employ different components arranged in similar or in different configurations.

The valley fill circuit 340 includes an inductor (L1) 342, a diode (D6) 344, and a switching element (S3) 346 arranged in a network having four nodes 302, 304, 336 and 350. Inductor (L1) 342, diode (D6) 344 and switching element (S3) 346 are connected to one another at node 350. More particularly, inductor (L1) 342 is connected between node 336 (a terminal of resistor (R13) 324) and node 350, diode (D6) 344 is connected between node 350 and node 302, and switching element (S3) 346 is connected between node 350 and common node 304. When closed, switching element (S3) 346 provides a zero-resistance path from node 350 to common node 304. In this regard, switching element (S3) may comprise various components including, for example, one or more transistors (e.g., MOSFET(s) and/or BJT(s) and/or IGBT(s)).

The current steering network 360 includes three capacitors (C9, C10, and C11) 362-366 and six diodes (D8, D9, D10, D11, D12, D13) 368-378 arranged in a network having six nodes 302, 304, 380-386. Capacitor (C9) 362 is connected to diode (D8) 368 and diode (D9) 370 at node 302 and to diode (D12) 376 and diode (D13) 378 at node 380. Capacitor (C10) 364 is connected to diode (D9) 368 and diode (D11) 374 at node 382 and to diode (D10) 372 and diode (D13) 378 at common node 304. Capacitor (C11) 366 is connected to diode (D9) 370 and diode (D12) 376 at node 384 and to diode (D10) 372 and diode (D11) 374 at node 386. Diode (D8) 368 is connected to diode (D9) 370 and capacitor (C9) 362 at node 302 and to diode (D11) 374 and capacitor (C10) 364 at node 382. Diode (D9) 370 is connected to diode (D8) 368 and capacitor (C9) 362 at node 302 and to diode (D12) 376 and capacitor (C11) 366 at node 384. Diode (D10) 372 is connected to diode (D11) 374 and capacitor (C11) 366 at node 386 and to capacitor (C10) 364 and diode (D13) 378 at common node 304. Diode (D11) 374 is connected to diode (D10) 372 and capacitor (C11) 366 at node 386 and to diode (D8) 368 and capacitor (C10) 364 at node 382. Diode (D12) 376 is connected to diode (D13) 378 and capacitor (C9) 362 at node 380 and to diode (D9) 370 and capacitor (C11) 366 at node 384. Diode (D13) is connected to diode (D12) 376 and capacitor (C9) 362 at node 380 and to capacitor (C10) 364 and diode (D10) 372 at common node 304.

The DC/DC converter 390 may be configured in a number of different manners. In this regard, DC/DC converter 390 may, for example, be configured to step-up or step-down the output voltage that is output to load 308. Regardless of its configuration, it is desirable that DC/DC converter 390 be of a constant power type. Stated another way, DC/DC converter 390 desirably presents pure resistive input impedance to the PFC front end 310. A constant power/pure resistive input impedance DC/DC converter 390 is desirable to avoid introducing a I/R negative impedance typical of many DC/DC converters.

Figure 1:
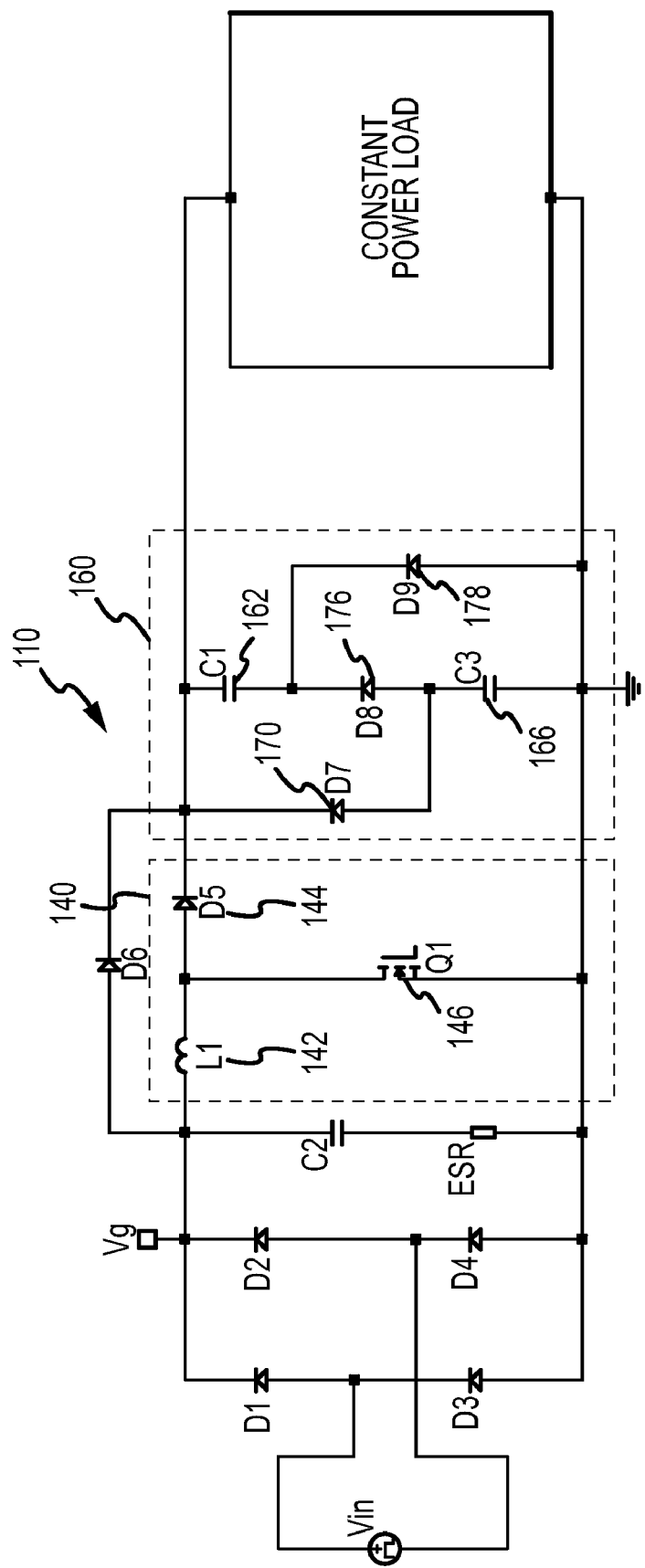
FIG. 1 is a schematic diagram showing a prior art AC to DC converter with a prior art PFC front end.
Figure 2:
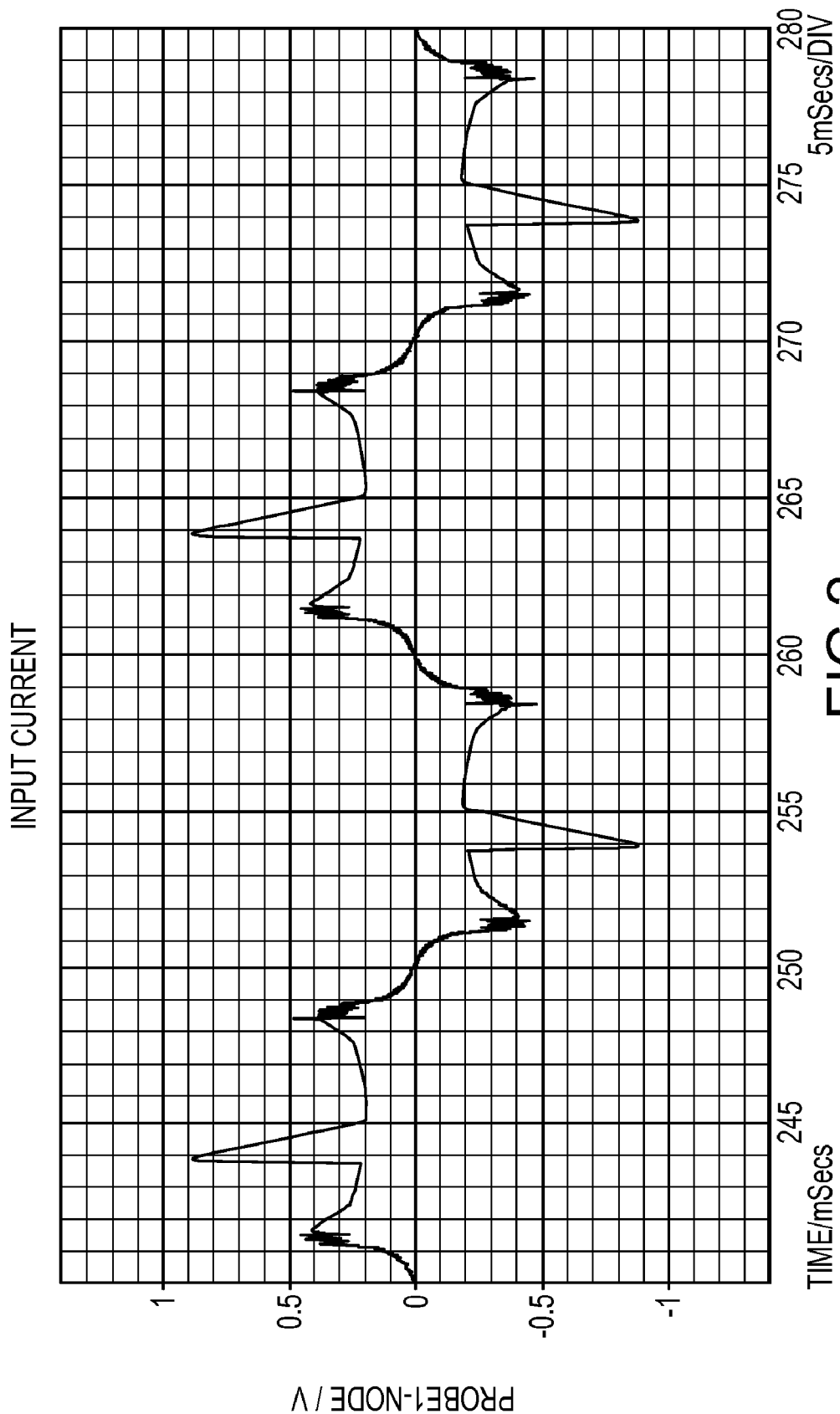
FIG. 2 is a plot of a simulated input current waveform for the AC to DC converter PFC front end shown in FIG. 1.
Figure 4:
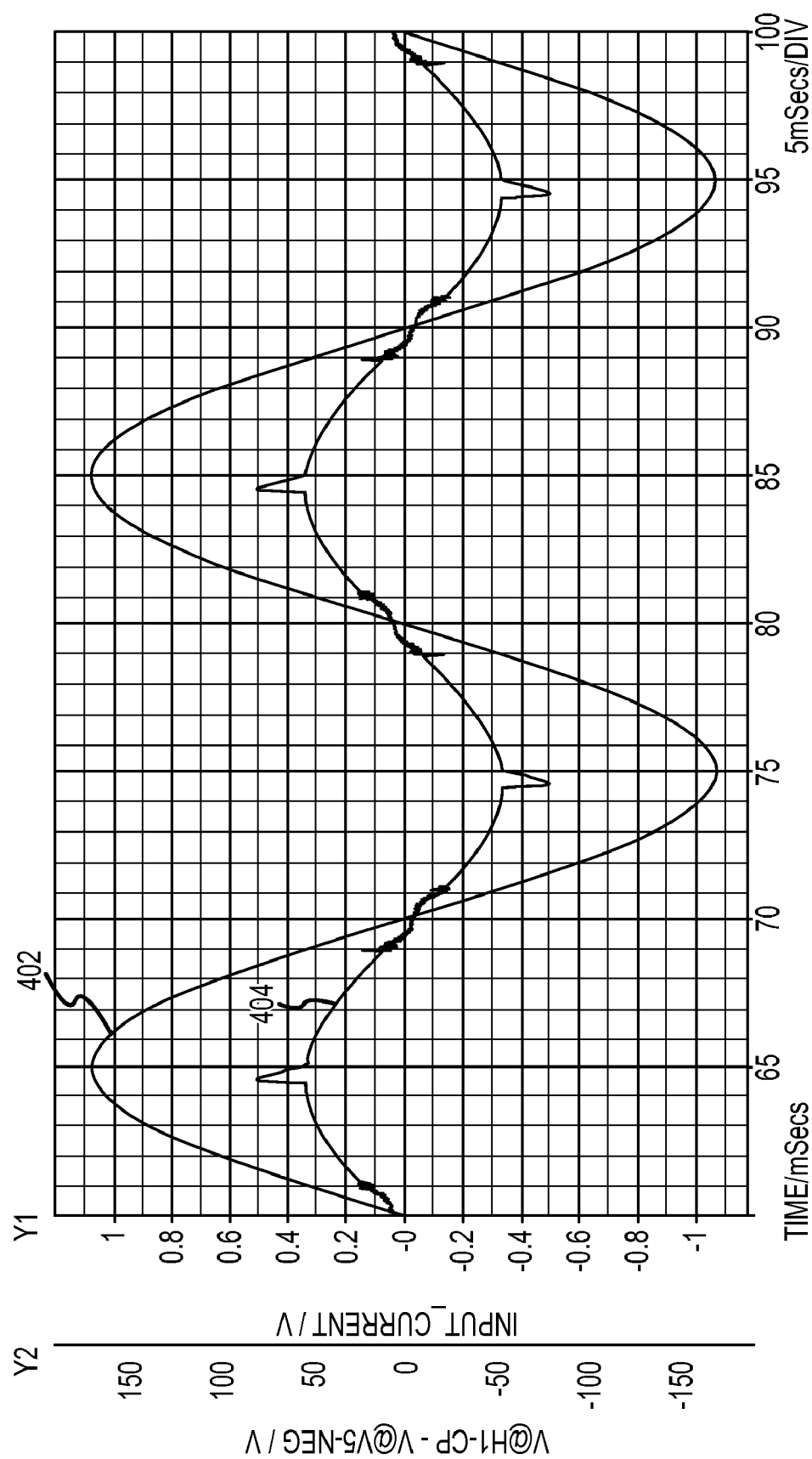
FIG. 4 is a plot showing a simulated input voltage waveform and corresponding input current waveform for the AC to DC converter of FIG. 3.

FIG. 4 is a plot showing a simulated input voltage waveform 402 and corresponding input current waveform 404 for the power converter 300 of FIG. 3 that combines the 3C&6D current steering network 360 with the boost valley filling circuit 340. As can be seen by comparing the plot of FIG. 4 with the plot of FIG. 2 for the prior art device, not only are the harmonic components of the input current waveform improved relative to the prior art device shown in FIG. 1, but the peak value of the current is suppressed. Here the DC/DC converter 390 is a constant power load and appears as a pure resistive impedance for the PFC stage. The 3C&6D current steering network 360 of the power converter 300 of FIG. 3 generates a less harmonic input current wave shape than the prior art 2C&3D network of FIG. 1.

Figure 5:
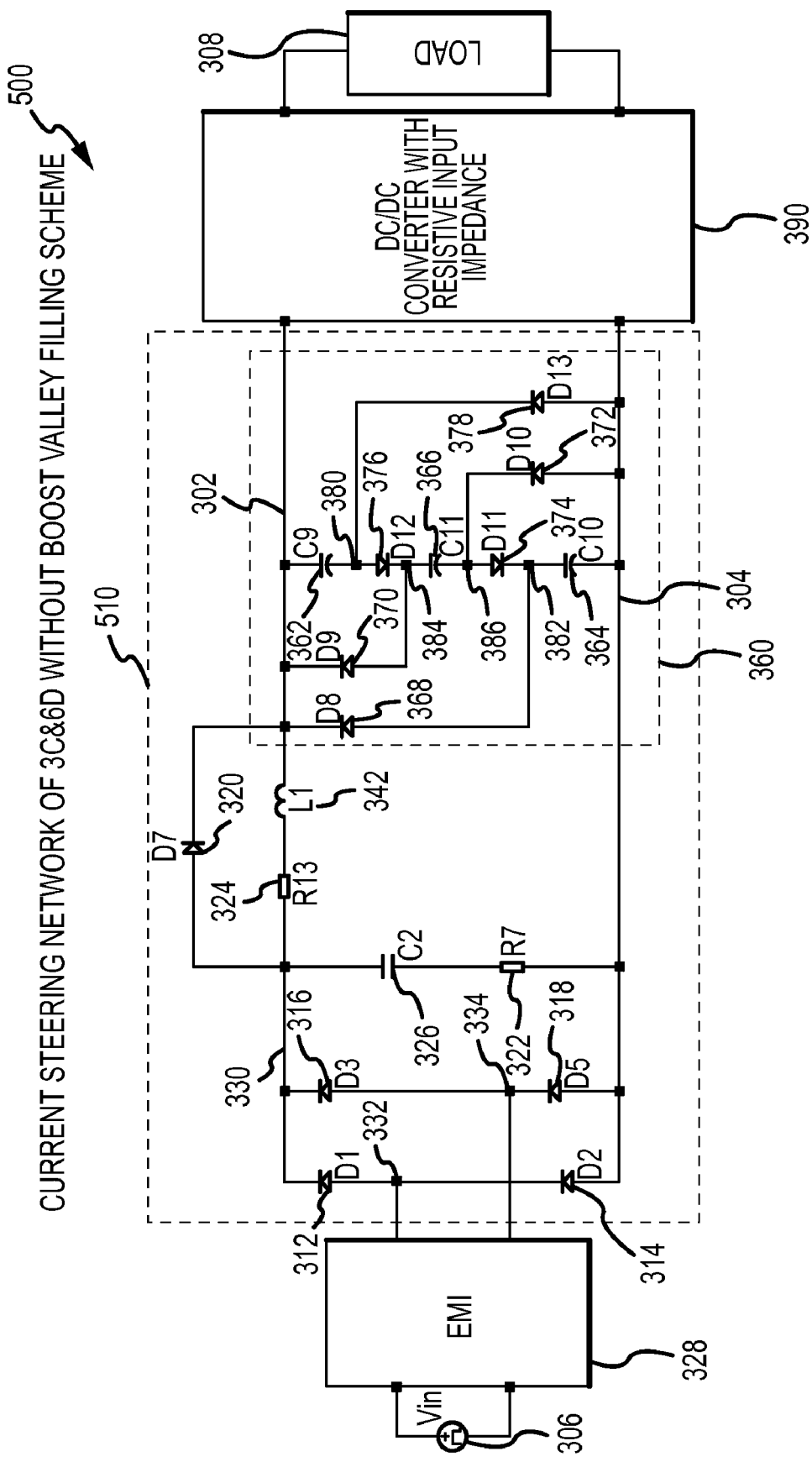
FIG. 5 is a schematic diagram of one embodiment of an AC to DC converter having a PFC front end with 3C&6D current steering circuitry and without valley filling circuitry, followed by a dc/dc converter with pure resistive input impedance.

FIG. 5 shows another embodiment of a power converter 500 configured differently than in the embodiment of FIG. 3. The PFC front end 510 of power converter 500 of FIG. 5 includes a 3C&6D current steering network 360 but does not implement the valley filling circuit. In this regard, switch (S3), and diode (D6) are not included in power converter 500. Instead, inductor (L1) 342 is connected directly with node 302.

Figure 6:
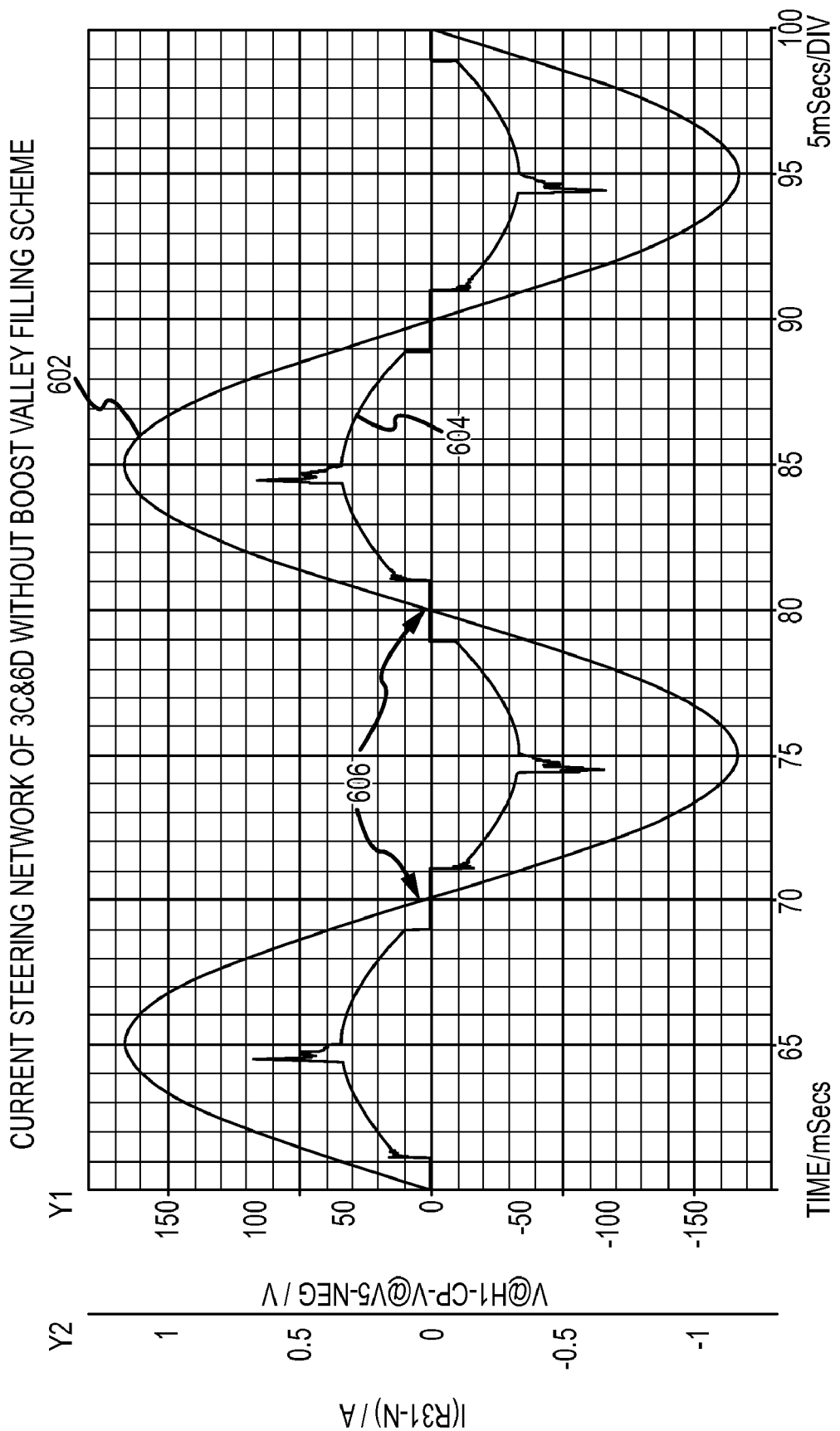
FIG. 6 is a plot showing a simulated input voltage waveform and corresponding input current waveform for the AC to DC converter of FIG. 5.

FIG. 6 is a plot showing a simulated input voltage waveform 602 and corresponding input current waveform 604 for the power converter 500 of FIG. 5 with the 3C&6D current steering network 360 without a boost valley filling circuit. As can be seen by comparing the plot of FIG. 6 with the plot of FIG. 4, the input harmonics are slightly increased but are still acceptable for many applications and represent an improvement over the prior art device of FIG. 1 that employs a 2C&3D current steering circuit rather than a 3C&6D current steering network and a constant power load which has a negative input impedance following the PFC stage. However, the absence of the valley filling circuit means that discontinuities 606 around the zero crossing points of the input current waveform 604 are not filled in as is the case with the power converter 300 of FIG. 3. Nevertheless, the presence of such discontinuities 606 may be acceptable for a number of applications.

Figure 7:
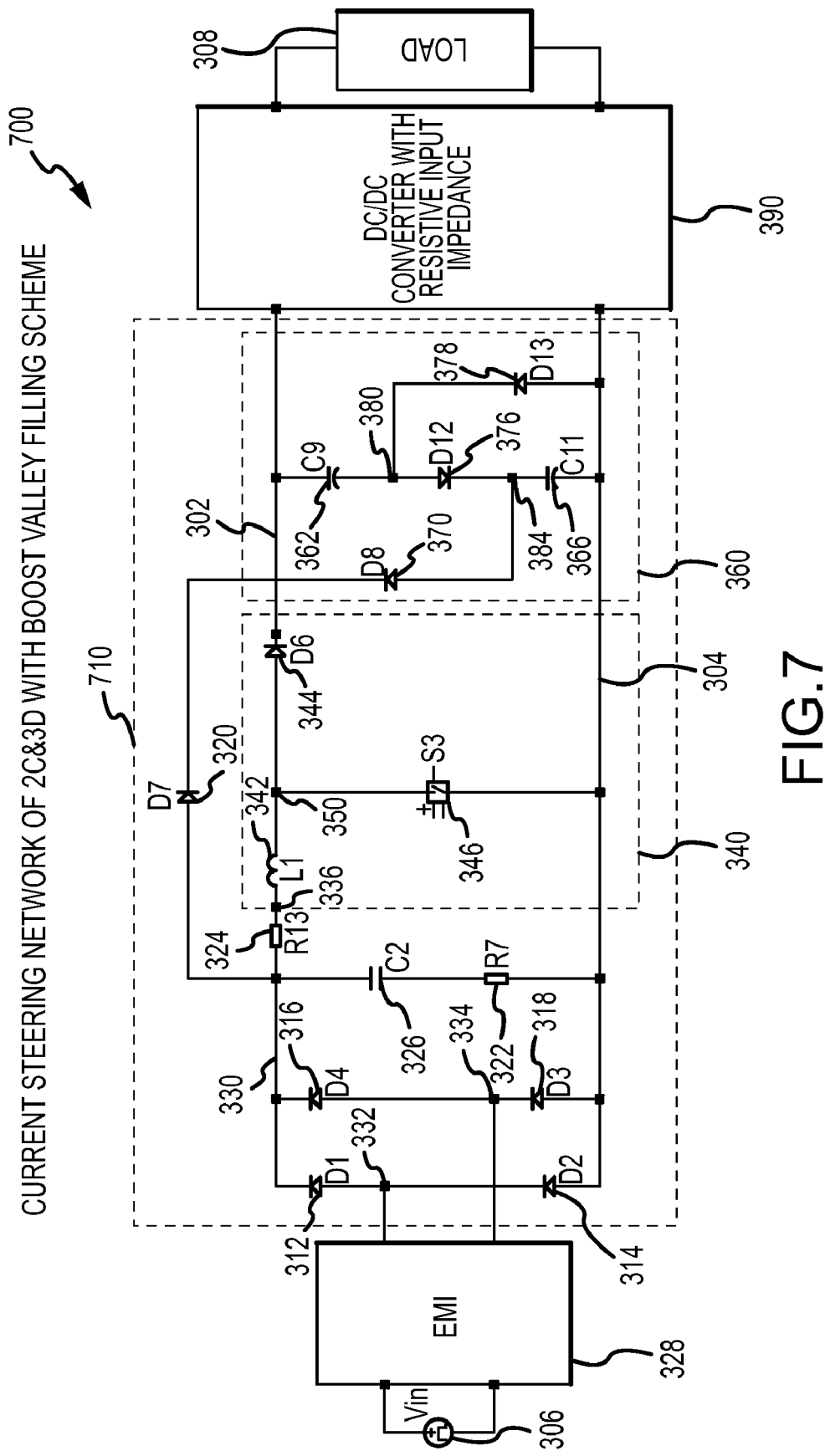
FIG. 7 is a schematic diagram of one embodiment of an AC to DC converter having a PFC front end combining 2C&3D current steering circuitry with valley filling circuitry, followed by a dc/dc converter with pure resistive input impedance.

FIG. 7 shows another embodiment of a power converter 700 configured differently than in the embodiment of FIG. 3. The PFC front end 710 of power converter 700 of FIG. 7 includes a 2C&3D current steering network 760 (instead of 3C&6D current steering circuit) along with the valley filling circuit 340. In this regard, the 2C&3D current steering circuit includes two capacitors (C9 and C11) 362 and 366 and three diodes (D9, D12 and D13) 370, 376 and 378 arranged in a network having four nodes 302, 304, 380 and 384. Capacitor (C9) 362 is connected to diode (D9) 370 at node 302 and to diode (D12) 376 and diode (D13) 378 at node 380. Capacitor (C11) 366 is connected to diode (D9) 370 and diode (D12) 376 at node 384 and to diode (D13) 378 at common node 304. Diode (D9) 370 is connected to capacitor (C9) 362 at node 302 and to diode (D12) 376 and capacitor (C11) 366 at node 384. Diode (D12) 376 is connected to diode (D13) 378 and capacitor (C9) 362 at node 380 and to diode (D9) 370 and capacitor (C11) 366 at node 384. Diode (D13) is connected to diode (D12) 376 and capacitor (C9) 362 at node 380 and to capacitor (C11) 366 at common node 304.

Figure 8:
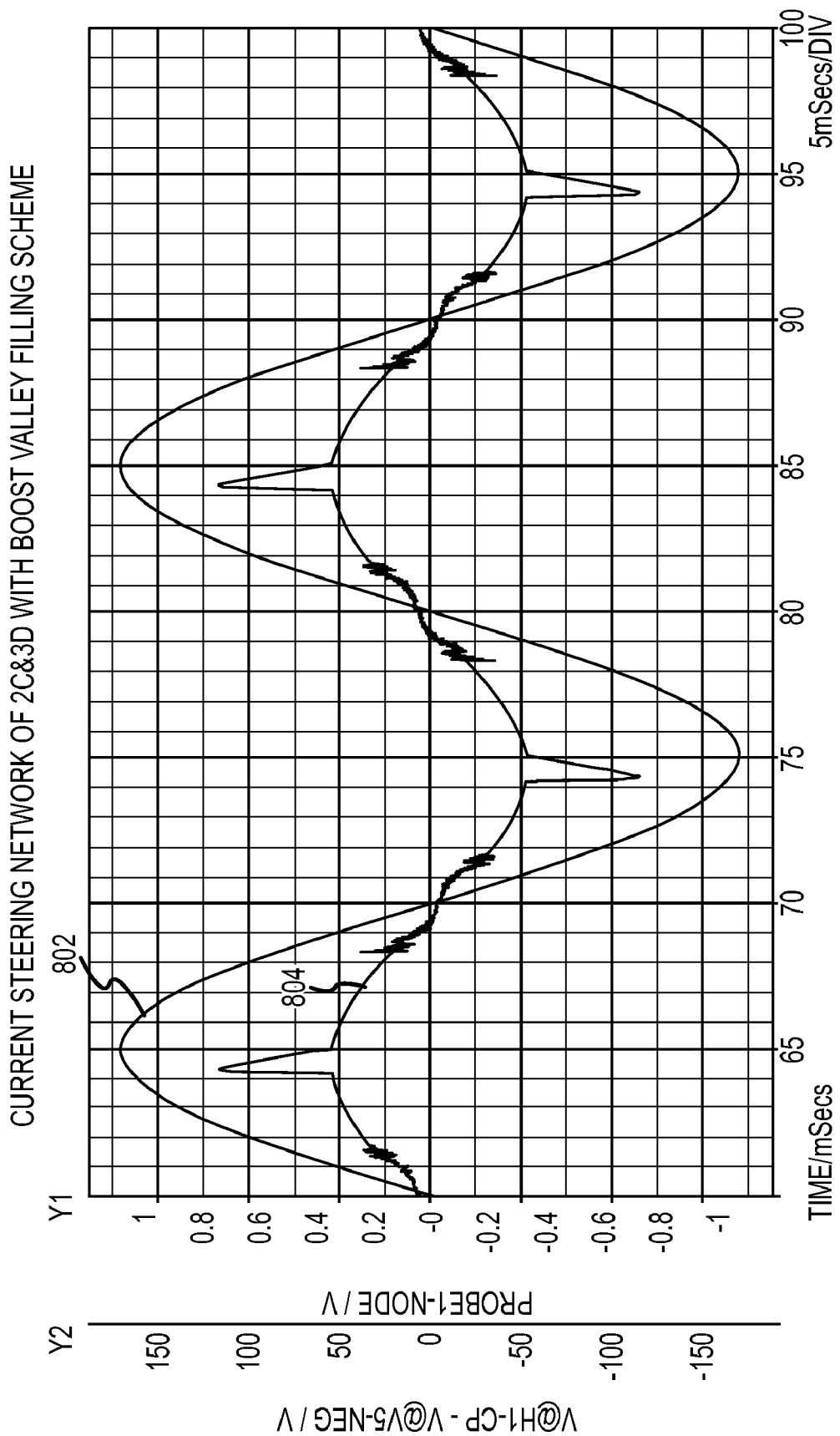
FIG. 8 is a plot showing a simulated input voltage waveform and corresponding input current waveform for the AC to DC converter of FIG. 7.

FIG. 8 is a plot showing a simulated input voltage waveform 802 and corresponding input current waveform 804 for the power converter 700 of FIG. 7 with the 2C&3D current steering network 760 and the boost valley filling circuit 340. As can be seen by comparing the plot of FIG. 8 with the plot of FIG. 4, the input harmonics are slightly increased but are still acceptable for many applications and represent an improvement of the input harmonics as compared with the prior art device of FIG. 1 that lacks a DC/DC converter following the PFC stage.

Figure 9:
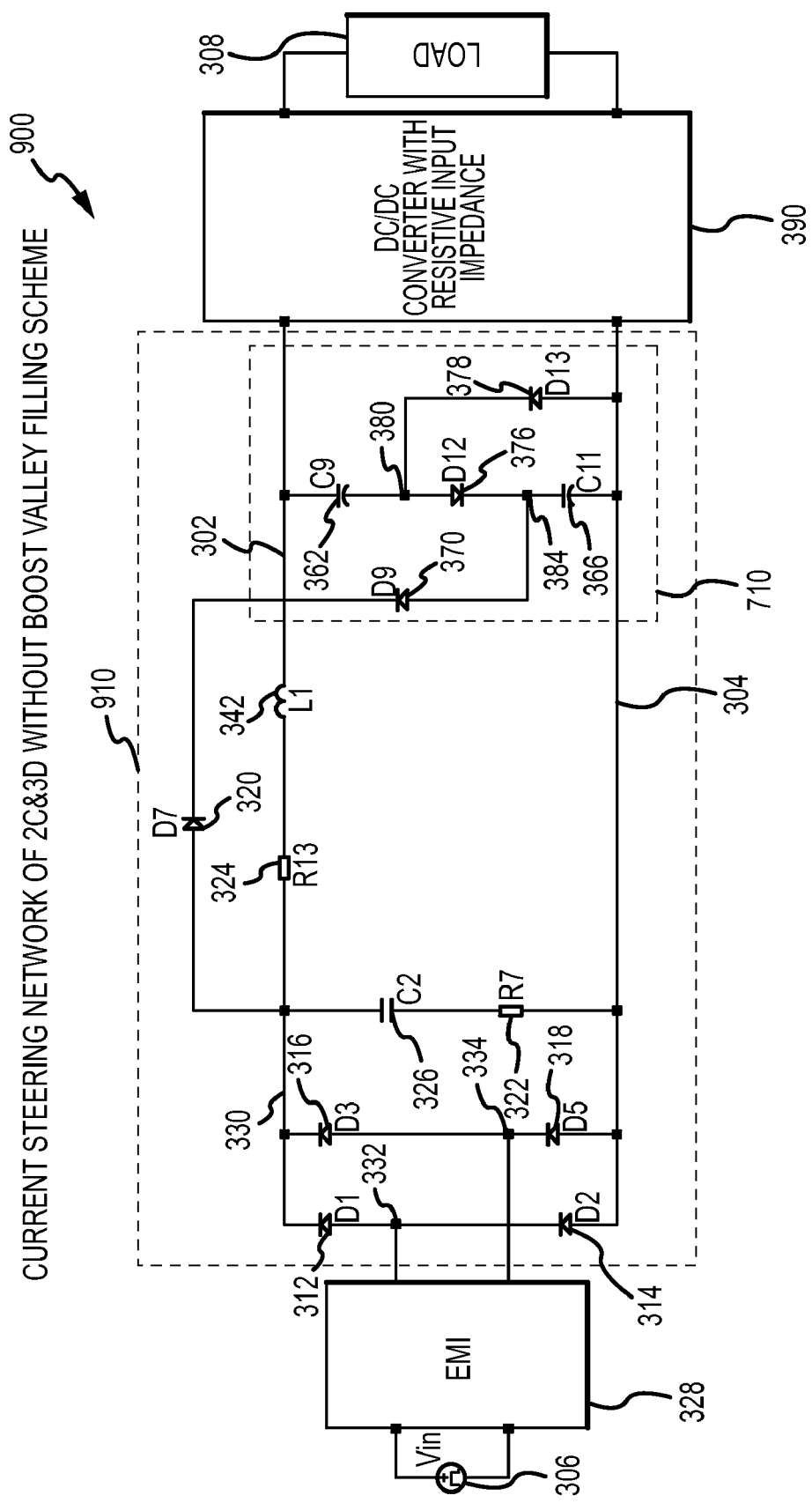
FIG. 9 is a schematic diagram of one embodiment of an AC to DC converter having a PFC front end with 2C&3D current steering circuitry and without valley filling circuitry, followed by a dc/dc converter with pure resistive input impedance.

FIG. 9 shows another embodiment of a power converter 900 configured differently than in the embodiment of FIG. 7. The PFC front end 910 of the power converter 900 of FIG. 9 includes a 2C&3D current steering network 760 similar to that of power converter 700 but does not implement a valley filling circuit. In this regard, switch (S3), and diode (D6) are not included in power converter 900. Instead, inductor (L1) 342 is connected directly with node 302.

Figure 10:
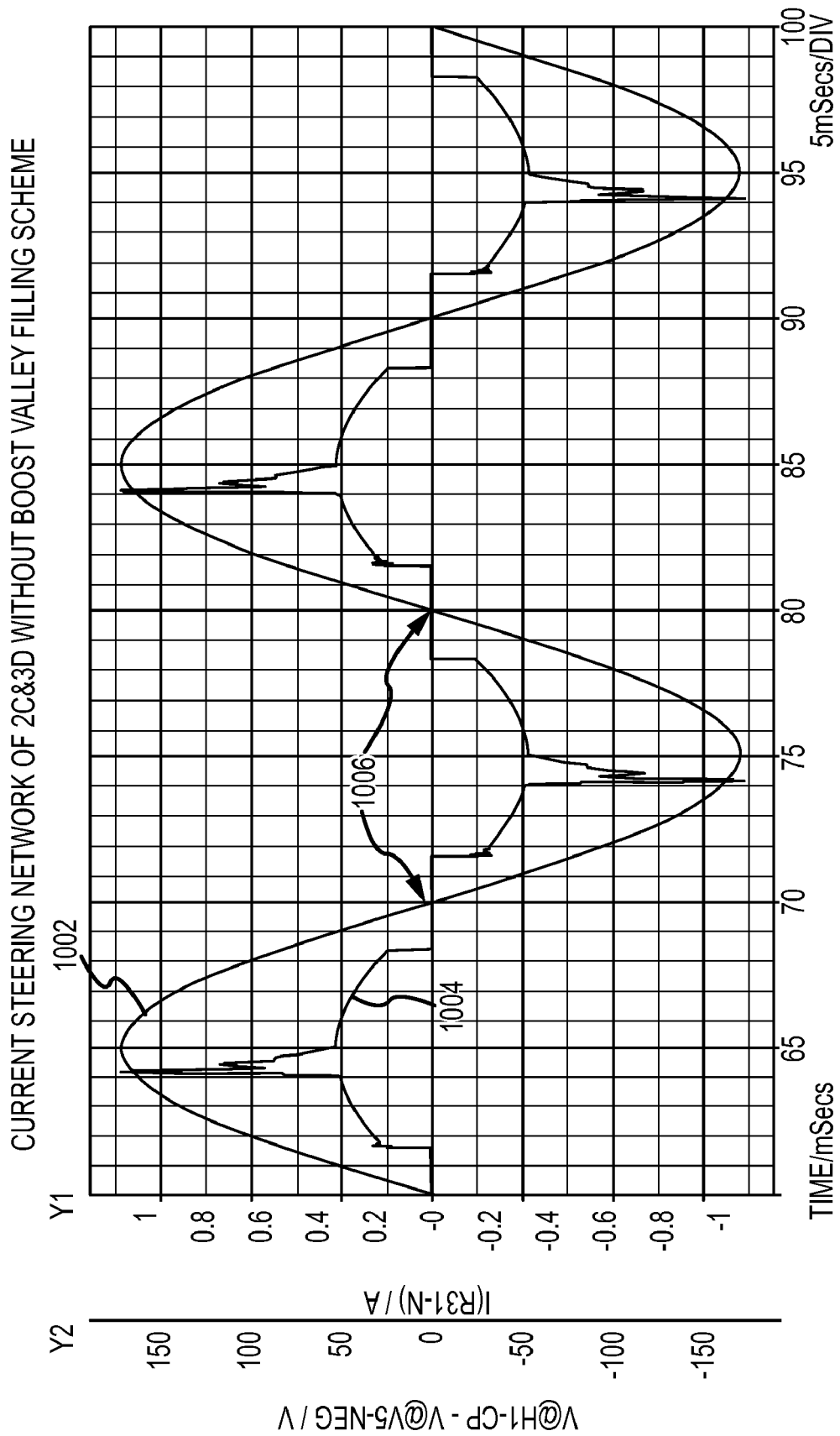
FIG. 10 is a plot showing a simulated input voltage waveform and corresponding input current waveform for the AC to DC converter of FIG. 9.

FIG. 10 is a plot showing a simulated input voltage waveform 1002 and corresponding input current waveform 1004 for the power converter 900 of FIG. 9 with the 2C&3D current steering network 760 and without a boost valley filling circuit. As can be seen by comparing the plot of FIG. 10 with the plot of FIG. 8, the input harmonics are slightly increased but are still acceptable for many applications and represent an improvement over the prior art device of FIG. 1 that employs a 2C&3D current steering circuit with a constant power load which has a negative input impedance following the PFC stage. However, the absence of the valley filling circuit means that discontinuities 1006 around the zero crossing points of the input current waveform 1004 are not filled in as is the case with the power converter 700 of FIG. 7. Nevertheless, the presence of such discontinuities 1006 may be acceptable for a number of applications.

The plots of FIGS. 4, 6, 8 and 10 are based on various exemplary components having specified electrical characteristics that may be employed in the differently configured power converters 300, 500, 700 and 900. However, the various embodiments are not limited to the exemplary capacitance, inductance, resistance, and threshold voltage ($V_{TH}$) values for the various capacitors, inductors, resistors and diodes included in the power converters 300, 500, 700 and 900 and such values may be varied as appropriate for different applications.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. An AC to DC converter connectable with an alternating current source and operable to output a direct current, said converter comprising:
a power factor corrective (PFC) front end including current steering circuitry that reduces harmonic components present in an input current waveform received by the PFC front end from the alternating current source, the current steering circuitry being connected between a first node and a common node of the PFC front end; and
a DC/DC converter following the PFC front end, wherein said DC/DC converter is connected in parallel with the current steering circuitry between the first node and the common node and presents pure resistive input impedance to the PFC front end, said DC/DC converter outputting the direct current to a load connected to said DC/DC converter.

2. The converter of claim 1 wherein said current steering circuitry comprises three capacitors and six diodes.

3. The converter of claim 2 wherein said three capacitors and six diodes are arranged in a network having six nodes and wherein:
a first capacitor is connected between the first node and a second node;
a second capacitor is connected between a third node and a fourth node;
a third capacitor is connected between a fifth node and the common node;
a first diode is connected between the first node and the fifth node;
a second diode is connected between the first node and the third node;
a third diode is connected between the second node and the third node;
a fourth diode is connected between the fourth node and the fifth node;
a fifth diode is connected between the fourth node and the common node; and
a sixth diode is connected between the second node and the common node.

4. The converter of claim 1 wherein said current steering circuitry comprises two capacitors and three diodes.

5. The converter of claim 4 wherein the two capacitors and three diodes are arranged in a network having four nodes and wherein:
a first capacitor is connected between the first node and a second node;
a second capacitor is connected between a third node and the common node;
a first diode is connected between the first node and the third node;
a second diode is connected between the second node and the third node; and
a third diode is connected between the second node and the common node.

6. The converter of claim 1 wherein said PFC front end further includes:
valley filling circuitry that reduces the presence of discontinuities in the input current waveform.

7. The converter of claim 6 wherein said valley filling circuitry comprises an inductor, a diode, and a switching element.

8. The converter of claim 7 wherein said diode, inductor, and switching element are arranged in a network having four nodes and wherein:
said diode is connected between the first node and a second node;
said inductor is connected between a third node and the second node; and
said switching element is connected between the second node and the common node.

9. AC to DC conversion means connectable with an alternating current source and operable to output a direct current, said conversion means comprising:
first stage means for correcting a power factor, said first stage means including current steering means for reducing harmonic components present in an input current waveform received by the first stage means from the alternating current source, the current steering means being connected between a first node and a common node of the first stage means; and
second stage means for outputting the direct current to a load connected to said second stage means, wherein said second stage means are connected in parallel with the current steering means between the first node and the common node and present pure resistive input impedance to the first stage means.

10. The conversion means of claim 9 wherein said current steering means comprise:
first charge storing means connected between the first node and a second node;
a second charge storing means connected between a third node and a fourth node;
a third charge storing means connected between a fifth node and the common node;
first current blocking means connected between the first node and the fifth node;
second current blocking means connected between the first node and the third node;
third current blocking means connected between the second node and the third node;
fourth current blocking means connected between the fourth node and the fifth node;

fifth current blocking means connected between the fourth node and the common node; and a sixth current blocking means connected between the second node and the common node.

11. The conversion means of claim 10 wherein said charge storing means comprise capacitors.

12. The conversion means of claim 10 wherein said current blocking means comprise diodes.

13. The conversion means of claim 9 wherein said current steering means comprise:

first charge storing means connected between the first node and a second node;

second charge storing means connected between a third node and the common node;

first current blocking means connected between the first node and the third node;

second current blocking means connected between the second node and the third node; and third current blocking means connected between the second node and the common node.

14. The conversion means of claim 13 wherein said charge storing means comprise capacitors.

15. The conversion means of claim 13 wherein said current blocking means comprise diodes.

16. The conversion means of claim 9 wherein said first stage means further include:

valley filling means for reducing the presence of discontinuities in the input current waveform.

17. The conversion means of claim 16 wherein said valley filling means comprise:

current blocking means connected between the first node and a second node;

current change opposing means connected between a third node and the second node; and switching means connected between the second node and the common node.

18. The conversion means of claim 17 wherein said current change opposing means comprise an inductor, said current blocking means comprise a diode, and said switching means comprise a transistor.

19. A current shaping AC to DC converter, said converter comprising:

a valley filling circuit connected to at least a first node and a common node;

a current steering circuit connected between the first node and the common node; and a constant power DC/DC converter connected with the current steering circuit and the valley filling circuit, wherein said DC/DC converter is connected in parallel with the current steering circuit between the first node and the common node and presents pure resistive input impedance to the current steering circuit.

20. The converter of claim 19 wherein said current steering circuit comprises three capacitors and six diodes.

21. The converter of claim 20 wherein said three capacitors and six diodes are arranged in a network having six nodes and wherein:

a first capacitor is connected between the first node and a second node;

a second capacitor is connected between a third node and a fourth node;

a third capacitor is connected between a fifth node and the common node;

a first diode is connected between the first node and the fifth node;

a second diode is connected between the first node and the third node;

a third diode is connected between the second node and the third node;

a fourth diode is connected between the fourth node and the fifth node;

a fifth diode is connected between the fourth node and the common node; and a sixth diode is connected between the second node and the common node.

22. The converter of claim 19 wherein said current steering circuit comprises two capacitors and three diodes.

23. The converter of claim 22 wherein the two capacitors and three diodes are arranged in a network having four nodes and wherein:

a first capacitor is connected between the first node and a second node;

a second capacitor is connected between a third node and the common node;

a first diode is connected between the first node and the third node;

a second diode is connected between the second node and the third node; and a third diode is connected between the second node and the common node.

24. The converter of claim 19 wherein said valley filling circuit comprises an inductor, a diode, and a switching element.

25. The converter of claim 24 wherein said diode, inductor and switching element are arranged in a network having four nodes and wherein:

said diode is connected between the first node and a second node;

said inductor is connected between a third node and the second node; and said switching element is connected between the second node and the common node.

* * * * *